(12) United States Patent
Fu

(10) Patent No.: US 10,640,147 B2
(45) Date of Patent: May 5, 2020

(54) METHOD FOR OPERATING A LANE-KEEPING ASSISTANCE SYSTEM

(71) Applicant: Robert Bosch GmbH, Stuttgart (DE)

(72) Inventor: Chengxuan Fu, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 16/008,684

(22) Filed: Jun. 14, 2018

(65) Prior Publication Data

US 2018/0362081 A1 Dec. 20, 2018

(30) Foreign Application Priority Data

Jun. 16, 2017 (DE) .................. 10 2017 210 090

(51) Int. Cl.
*B62D 15/02* (2006.01)
*G06K 9/00* (2006.01)

(52) U.S. Cl.
CPC ....... *B62D 15/025* (2013.01); *G06K 9/00798* (2013.01); *B60T 2201/08* (2013.01); *G05D 2201/0213* (2013.01)

(58) Field of Classification Search
CPC ............ B62D 15/025; G06K 9/00798; G05D 2201/0213; B60T 2201/08; B60W 30/12; B60W 40/08; B60W 2540/04; B60W 2550/22

See application file for complete search history.

(56) References Cited

U.S. PATENT DOCUMENTS

2011/0010021 A1\* 1/2011 Kobayashi .......... B60T 8/17557
701/1

FOREIGN PATENT DOCUMENTS

DE 102006040334 A1 3/2008

\* cited by examiner

*Primary Examiner* — Yuen Wong
(74) *Attorney, Agent, or Firm* — Norton Rose Fulbright US LLP; Gerard Messina

(57) ABSTRACT

A method for operating a lane-keeping assistance system of a vehicle includes: detecting at least two lane markings in a traffic space ahead of the vehicle using a sensor system; recognizing the separation of a primary lane into a first secondary lane and a second secondary lane based on the at least two detected lane markings; selecting one of the secondary lanes, including detecting and analyzing a signal representing an instantaneous driver intention; calculating a target trajectory of the selected secondary lane; activating a steering device of the vehicle for guiding the vehicle along the calculated target trajectory of the selected secondary lane.

11 Claims, 3 Drawing Sheets

Fig. 2

METHOD FOR OPERATING A LANE-KEEPING ASSISTANCE SYSTEM

CROSS-REFERENCE TO RELATED APPLICATIONS

The present application claims priority under 35 U.S.C. § 119 to DE 10 2017 210 090.7, filed in the Federal Republic of Germany on Jun. 16, 2017, the content of which is hereby incorporated by reference herein in its entirety.

FIELD OF THE INVENTION

The present invention relates to a lane-keeping assistance system, a method for operating a lane-keeping assistance system, and a computer program product for execution of a method for operating a lane-keeping assistance system.

BACKGROUND

A method for detecting a lane, including a driver assistance system of a vehicle that includes a sensor system for recognizing a lane, is known from DE 10 2006 040 334 A1. The sensor system for recognizing the lane is used to detect lane markings in an area of a traffic space situated ahead of the vehicle. The lane markings are assigned nodes having at least coordinates of a first coordinate system. The coordinates of the nodes are converted into a second coordinate system. The course of lane markings and/or lanes is reconstructed based on the position of the nodes in the second coordinate system.

SUMMARY

According to an example embodiment of the present invention, a method for operating a lane-keeping assistance system of a vehicle includes detecting at least two lane markings in a traffic space situated ahead of the vehicle with the aid of a sensor system, recognizing the separation of a primary lane into a first secondary lane and into an at least second secondary lane on the basis of the at least two detected lane markings, selecting one of the at least two secondary lanes, calculating a target trajectory of the selected secondary lane, and activating a steering device of the vehicle for guiding the vehicle along the calculated target trajectory of the selected secondary lane, where the step of selecting one of the at least two secondary lanes includes detecting a signal representing the instantaneous driver intention and analyzing the signal representing the instantaneous driver intention.

A target trajectory serves as orientation for the lane-keeping assistance system. A calculated target trajectory can serve as a guiding line along which the vehicle is guided. A calculated target trajectory can be a parallel line having a first distance to a first lane marking and having a second distance to a second lane marking. The first distance and the second distance can be approximately the same. In this variant, a calculated target trajectory can be the lane center of a lane. A calculated target trajectory can be, in particular, the lane center of the selected secondary lane. In another variant, the first distance to the first lane marking can differ from the second distance to the second lane marking. In this variant, the target trajectory runs offset relative to the lane center of a lane.

An advantage of the present invention is that the method can also be used in implausible situations. The method is not discontinued in previously implausible situations. If, for example, the driver wishes to drive along a particular lane of the recognized secondary lanes, this intention is recognized. The method is not overridden by the intention, and discontinued as is usual in known methods. Instead, the driver intention can be specifically utilized for the method. This increases the availability of the method.

In an advantageous embodiment of the present invention, the detection of the signal representing the instantaneous driver intention takes place with the aid of an input of the driver.

The signal representing the instantaneous driver intention can be generated, in particular, by actuating a steering wheel of the vehicle. Alternatively, the signal representing the instantaneous driver intention can also be a signal, which is detected by an input of the driver, for example, via a joystick or via keys. At least one gesture and/or the viewing direction of the driver can also be detected via a device for recognizing the vehicle passenger compartment, and can be converted into a signal representing the instantaneous driver intention. The vehicle passenger compartment can be recognized with the aid of at least one camera.

An advantage is that it may be enjoyable for the driver of the vehicle if the driver is able to introduce the driver's intention into the method. It may be enjoyable for the driver to introduce the driver's selection of the recognized secondary lane into the method.

In an example embodiment according to the present invention, it is provided that the signal representing the instantaneous driver intention includes a first value and a second value. The second value is assignable to at least two sub-areas. The first value and the second value are detected during the detection of the signal representing the instantaneous driver intention.

The first value of the signal representing the instantaneous driver intention can represent a piece of information as to how clear the input of the driver intention is. For this purpose, the signal representing the instantaneous driver intention can be analyzed with respect to a change. The first value indicates, in particular, the measure of the change. The amount of the first value, in particular, indicates the measure of the change.

The second value of the signal representing the instantaneous driver intention can represent a piece of information in which direction the vehicle is to be guided based on the driver intention. For this purpose, the signal representing the instantaneous driver intention can be analyzed with respect to a direction input by the driver. The second value can, for example, be assigned a first sub-area. The first sub-area can represent a first direction. The first sub-area in this case can, for example, include the driver intention being that of steering the vehicle to the left along the movement direction. The second value can be assigned a second sub-area. The second sub-area can represent a second direction. In the aforementioned example, a second sub-area could, for example, include the driver intention being that of steering the vehicle to the right along the movement direction. The second value can be assigned a third sub-area. The third sub-area can represent a third direction. In the aforementioned example, a third sub-area could, for example, include the intention of the driver being that of maintaining the movement direction of the vehicle.

In an example advantageous embodiment of the present invention, it is provided that when analyzing the signal representing the instantaneous driver intention, the first value is compared with a threshold value. The amount of the first value, in particular, is compared with a threshold value. In this way, the signal representing the instantaneous driver intention can be analyzed with respect to a change. It can be assumed that the change of the signal representing the instantaneous driver intention is clear enough if the first value, in particular, the amount of the first value, exceeds the threshold value. It can be assumed that the input of the driver intention is clear enough if the first value, in particular, the amount of the first value exceeds the threshold value. An advantage is that falsely recognized driver intentions can be avoided. The input of the driver intention, if it is clear enough, can be correctly evaluated.

In an example advantageous embodiment of the present invention, it is provided that for the case in which the first value exceeds the threshold value, the selection of one of the at least two secondary lanes is a function of the second value of the signal representing the instantaneous driver intention. Thus, the selection of one of the at least two secondary lanes can be a function of the direction in which the vehicle is to be guided based on the driver intention.

An advantage is that by assigning the second value to at least two sub-areas, the intention of the driver can be reliably recognized with respect to the driver's selected secondary lane. The intention of the driver with respect to the other movement direction of the vehicle can be reliably recognized.

In an example advantageous embodiment of the present invention, it is provided that for the case in which the first value is equal to or falls below the threshold value, the selection of one of the at least two secondary lanes is a function of a predefined criterion.

An advantage is that even in the case of an input of the driver intention that is not clear enough for the method, the method still does not have to be immediately discontinued.

In an example advantageous embodiment of the present invention, it is provided that the predefined criterion is the type of lane marking and/or the curvature of the lane marking. An advantage is that typical driving situations can be reliably recognized by the type of lane marking. Thus, in such typical driving situations, one of the at least two secondary lanes can also be selected.

In an example advantageous embodiment of the present invention, it is provided that the step of recognizing the separation of a primary lane into a first secondary lane and into an at least second secondary lane includes the following steps: the calculation of an instantaneous lane width based on the at least two detected lane markings and the comparison of the instantaneous lane width with a predefined lane width. An advantage is that the method can also be used in situations, in which the recognition of the separation of a primary lane into at least two secondary lanes was previously difficult or not possible. The separation can be recognized early.

In an example advantageous embodiment of the present invention, it is provided that the predefined lane width is stored in a memory unit of the lane-keeping assistance system and/or is calculated based on the detected lane markings. An advantage is that the separation can be reliably recognized.

According to an example embodiment of the present invention, a lane-keeping assistance system of a vehicle includes a sensor system for detecting at least two lane markings in a traffic space situated ahead of the vehicle. The lane-keeping assistance system further includes a processing unit for recognizing the separation of a primary lane into a first secondary lane and into an at least second secondary lane based on the two detected lane markings. The lane-keeping assistance system includes a means for selecting one of the at least two secondary lanes. The lane-keeping assistance system further includes a means for calculating a target trajectory of the selected secondary lane. The lane-keeping assistance system further includes an activation means for activating a steering device of the vehicle for guiding the vehicle along the calculated target trajectory of the selected secondary lane. The lane-keeping assistance system further includes a detection unit for detecting a signal representing the instantaneous driver intention. The means for selecting one of the at least two secondary lanes is designed to analyze the signal representing the instantaneous driver intention.

According to an example embodiment of the present invention, a computer program product includes program code for carrying out the above described method.

Exemplary embodiments of the present invention are described in greater detail below with reference to the appended drawings in which identical reference numerals in the figures identify identical elements or identically functioning elements.

DETAILED DESCRIPTION

Figure 1A:
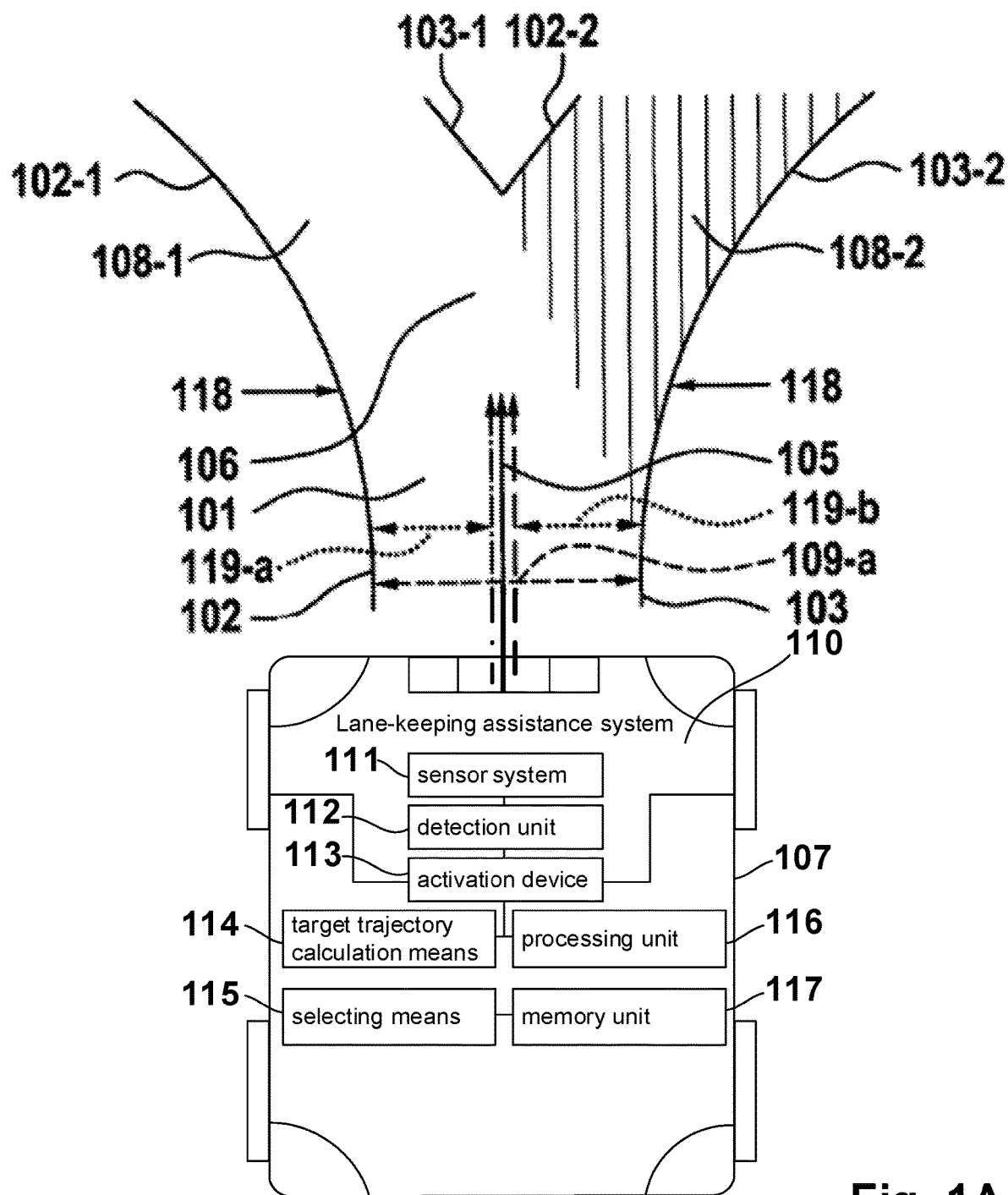
FIG. 1A shows a vehicle moving on a separating lane with no marking of the separation at a first point in time, according to an example embodiment of the present invention.

FIG. 1A shows by way of example, a vehicle 107 moving on a lane 101 at a first point in time. Vehicle 107 includes lane-keeping assistance system 110. Lane-keeping assistance system 110 includes a sensor system 111. Sensor system 111 can include at least one sensor for detecting traffic space 106 situated ahead of vehicle 107. Sensor system 111 can include, in particular, at least one video camera, at least one radar sensor, at least one LIDAR sensor, and/or at least one ultrasonic sensor. Objects, in particular lane markings, can be detected with the aid of sensor system 111. Sensor system 111 can have a maximum range. For example, the distance up to which traffic space 106 is detected, can be limited.

Lane 101 is identified below as primary lane 101. Primary lane 101 includes first lane marking 102 on the one side. Primary lane 101 includes second lane marking 103 on the other side. If vehicle 107 is located in the position in primary lane 101 shown in FIG. 1A, then sensor system 111 detects, for example, lane marking 102 and lane marking 103 of primary lane 101.

Lane-keeping assistance system 110 can calculate an instantaneous lane width based on at least two detected lane markings. Lane-keeping assistance system 110 of vehicle 107 can calculate instantaneous lane width 109-$a$ of primary lane 101 based on lane marking 102 and on lane marking 103 of primary lane 101.

In an example not shown, sensor system 111 detects multiple lane markings. In this case, lane-keeping assistance system 110 can select lane markings, which delimit the instantaneous lane. Lane-keeping assistance system 110 includes processing unit 114 for selecting the lane markings. Processing unit 114 can also calculate the instantaneous lane width.

The selection can take place based on the distance between a first lane marking on a first side of the lane and a second lane marking on a second side of the lane. Two lane markings can be selected, for example, the distance between which corresponds to a predefined lane width. A predefined lane width can, for example, be stored in a memory unit 117 of lane-keeping assistance system 110.

The selection can take place alternatively or in addition, based on the color of the lane markings. If, for example, yellow and white lane markings are recognized, then the yellow lane markings can preferably be selected.

The selection can take place, alternatively or in addition, based on the type of the detected lane markings. The type of lane markings can be understood to mean, for example, the type of the longitudinal marking of a lane. The longitudinal marking of a lane can, for example, be a solid line, a broken line, a solid double line, a broken double line or both a solid double line as well as a broken double line.

Lane-keeping assistance system 110 further includes means 116. Means 116 of lane-keeping assistance system 110 calculates target trajectory 105. Target trajectory 105 in the example is calculated based on lane marking 102 and lane marking 103. In the example, first distance 119-$a$ to first lane marking 102 is almost the same as second distance 119-$b$ to second lane marking 103. Target trajectory 105 is accordingly the lane center of primary lane 101.

Lane-keeping assistance system 110 further includes activation device 113 for activating a steering device of vehicle 107. Activation device 113 activates the steering device of vehicle 107 in such a way that the vehicle is guided along a target trajectory. Activation device 113 can activate the steering device of vehicle 107 in such a way that the transverse position of vehicle 107 with respect to the calculated lane center is minimized. Activation device 113 can activate the steering device of vehicle 107 in such a way that vehicle 107 moves along calculated lane center 105. Vehicle 107 moves in the direction of arrow 105.

In the further course of the movement direction of vehicle 107, primary lane 101 separates into first secondary lane 108-1 and into second secondary lane 108-2. Primary lane 101 separates into first secondary lane 108-1 and into second secondary lane 108-2 at the point marked with 118. First secondary lane 108-1 can have a curvature as in the exemplary embodiment here. First secondary lane 108-1 has its first lane marking 102-1 on its one side. First secondary lane 108-1 has its second lane marking 103-1 on its other side. Second secondary lane 108-2 can have a curvature as in the exemplary embodiment here. Second secondary lane 108-2 has its first lane marking 102-2 on its one side. Second secondary lane 108-2 has its second lane marking 103-2 on its other side. The separation of primary lane 101 into first secondary lane 108-1 and into second secondary lane 108-2 is not separately marked. There is no marking present to indicate the separation of the lane. An exact delimitation of first secondary lane 108-1 from second secondary lane 108-2 is not present.

Figure 1B:
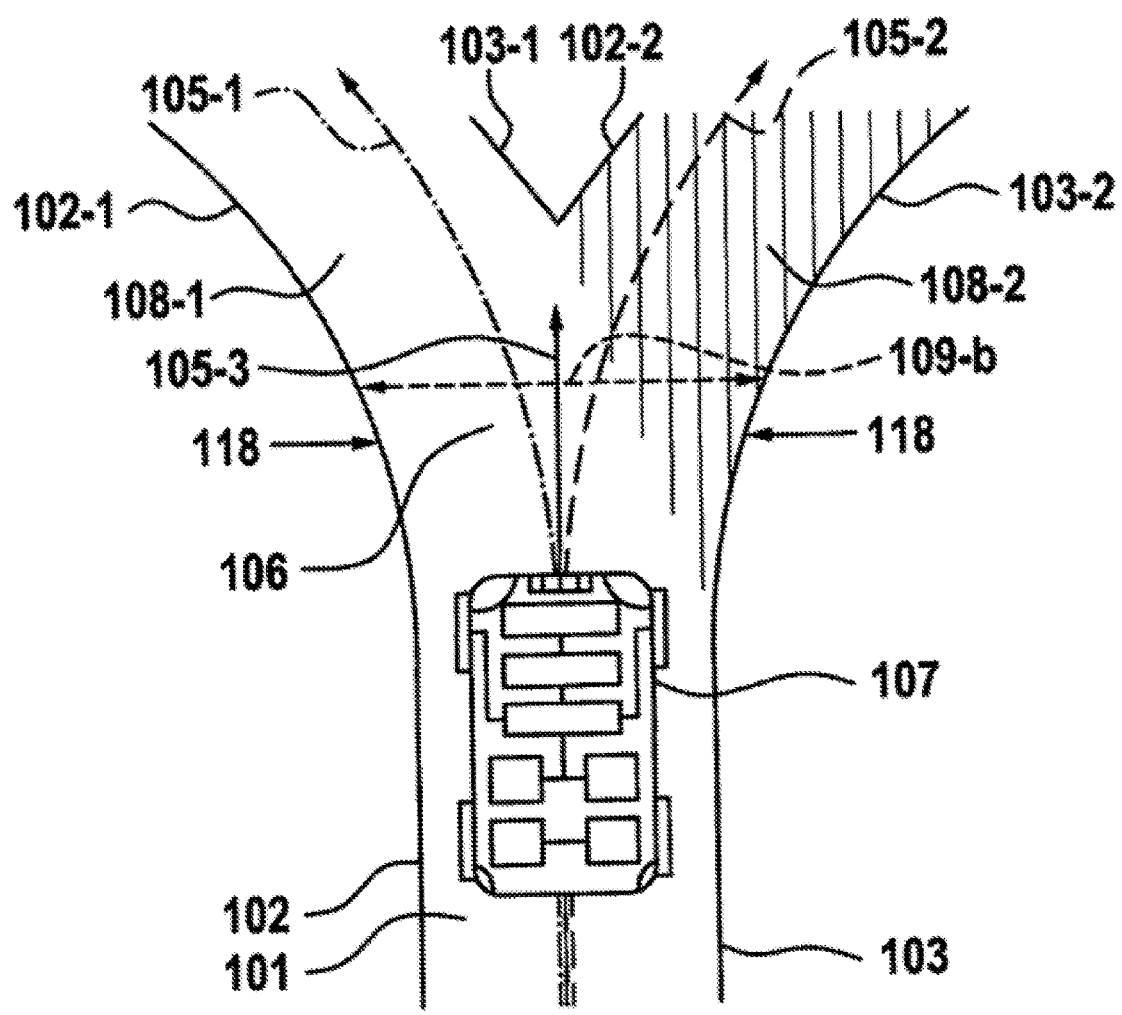
FIG. 1B shows a vehicle moving on a separating lane with no marking of the separation at a second point in time, according to an example embodiment of the present invention.

FIG. 1B shows vehicle 107 from FIG. 1A moving in a lane at a second, later point in time. Vehicle 107 has moved along direction 105. At this second point in time, vehicle 107 is located in a different position in primary lane 101 compared to the first point in time. At this second point in time, vehicle 107 is located spatially closer to the position of primary lane 101, at which the separation of primary lane 101 into first secondary lane 108-1 and into second secondary lane 108-2 begins. Primary lane 101 begins to separate along movement direction 105 in direct proximity to vehicle 107.

Sensor system 111 can have a maximum range. Thus, it can be that sensor system 111 detects first lane marking 102-1 of first secondary lane 108-1 and second lane marking 103-2 of second secondary lane 108-2. At this point in time, sensor system 111 does not yet detect second lane marking 103-1 of first primary lane 108-1. At this point in time, sensor system 111 also does not yet detect first lane marking 102-2 of second primary lane 108-2.

It is difficult with known lane-keeping assistance systems to recognize the separation of primary lane 101 into first secondary lane 108-1 and into second secondary lane 108-2 at the point in time at which vehicle 107 is located in the position in primary lane 101 shown in FIG. 1B. The lack of delimitation of first secondary lane 108-1 from second secondary lane 108-2 impedes the recognition of the separation. A recognition of the separation may also be impeded by preceding vehicles obscuring additional lane markings and/or by damaged lane markings. A known lane-keeping assistance system, for example, would calculate target trajectory 105-3 as no longer plausible at this point in time, based on detected lane marking 102-1 of first primary lane 108-1 and based on detected lane marking 103-2 of second primary lane 108-2.

The separation of primary lane 101 into first secondary lane 108-1 and into second secondary lane 108-2 could, in the further course, possibly be detected by a known lane-keeping assistance system. However, since first secondary lane 108-1 and second secondary lane 108-2 in the example, are approximately symmetrical, it can be difficult for a known lane-keeping assistance system to select one of the two secondary lanes. The lane-keeping assistance system is switched off, if necessary, due to the implausible situation. Additionally, problems may arise even if a known lane-keeping assistance system selects one of secondary lanes 108-1 or 108-2. For example, it may be that a lane-keeping assistance system selects first secondary lane 108-1, but the driver of the vehicle wishes to drive along second secondary lane 108-2 (or vice versa). If the driver in this situation steers the vehicle in the direction of secondary lane 108-2 selected by the driver, the driver may perceive an undesirable torque on the steering wheel. The lane-keeping assistance system is switched off, if necessary, due to the overriding of the lane-keeping assistance system by the driver.

The problems just described, or comparable problems, can be avoided by lane-keeping assistance system 110 shown in FIG. 1A and FIG. 1B. The associated method is explained more precisely below based on FIG. 2.

With respect to the situation shown in FIG. 1B, it is noted that processing unit 114 of lane-keeping assistance system 110 is able to calculate instantaneous lane width 109-$b$ based on detected lane marking 102-1 of first secondary lane 108-1 and of detected lane marking 103-2 of second secondary lane 108-2. Lane-keeping assistance system 110 is able, with the aid of processing unit 114, to recognize the separation of primary lane 101 into first secondary lane 108-1 and into second secondary lane 108-2. Lane-keeping assistance system 110 is able to recognize the separation of primary lane 101 based on instantaneous lane width 109-$b$ (see FIG. 2).

Lane-keeping assistance system 110 further includes a detection unit 112. With the aid of detection unit 112, it is possible to detect a signal representing the instantaneous driver intention. Detection unit 112 also detects the first value and the second value of the signal representing the instantaneous driver intention.

The first value of the signal representing the instantaneous driver intention can represent a piece of information as to how clear the input of the driver intention is. For this purpose, the signal representing the instantaneous driver intention can be analyzed with respect to a change. The first value indicates, in particular, the measure of the change. The amount of the first value, in particular, indicates the measure of the change.

The second value of the signal representing the instantaneous driver intention can represent a piece of information indicating in which direction the vehicle is to be guided based on the driver intention. For this purpose, the signal representing the instantaneous driver intention can be analyzed with respect to a direction input by the driver. The second value is assignable to at least two sub-areas.

Detection unit 112 can, for example, be a steering wheel, a joystick and/or a keypad. Detection unit 112 can also be a device for recognizing the vehicle passenger compartment. The device for recognizing the vehicle passenger compartment can include a camera, for example.

Lane-keeping assistance system 110 further includes means 115 for selecting one of the at least two secondary lanes. Secondary lane 108-1 can be selected, for example. In this case, activation device 113 activates the steering device of vehicle 107 in such a way that vehicle 107 moves along target trajectory 105-1 of secondary lane 108-1. Target trajectory 105-1 of secondary lane 108-1 in the example shown represents the lane center of secondary lane 108-1. Alternatively, secondary lane 108-2 can be selected. In this case, activation device 113 activates the steering device of vehicle 107 in such a way that vehicle 107 moves along target trajectory 105-2 of secondary lane 108-2. Target trajectory 105-2 of secondary lane 108-2 in the example shown represents the lane center of secondary lane 108-2.

Figure 2:
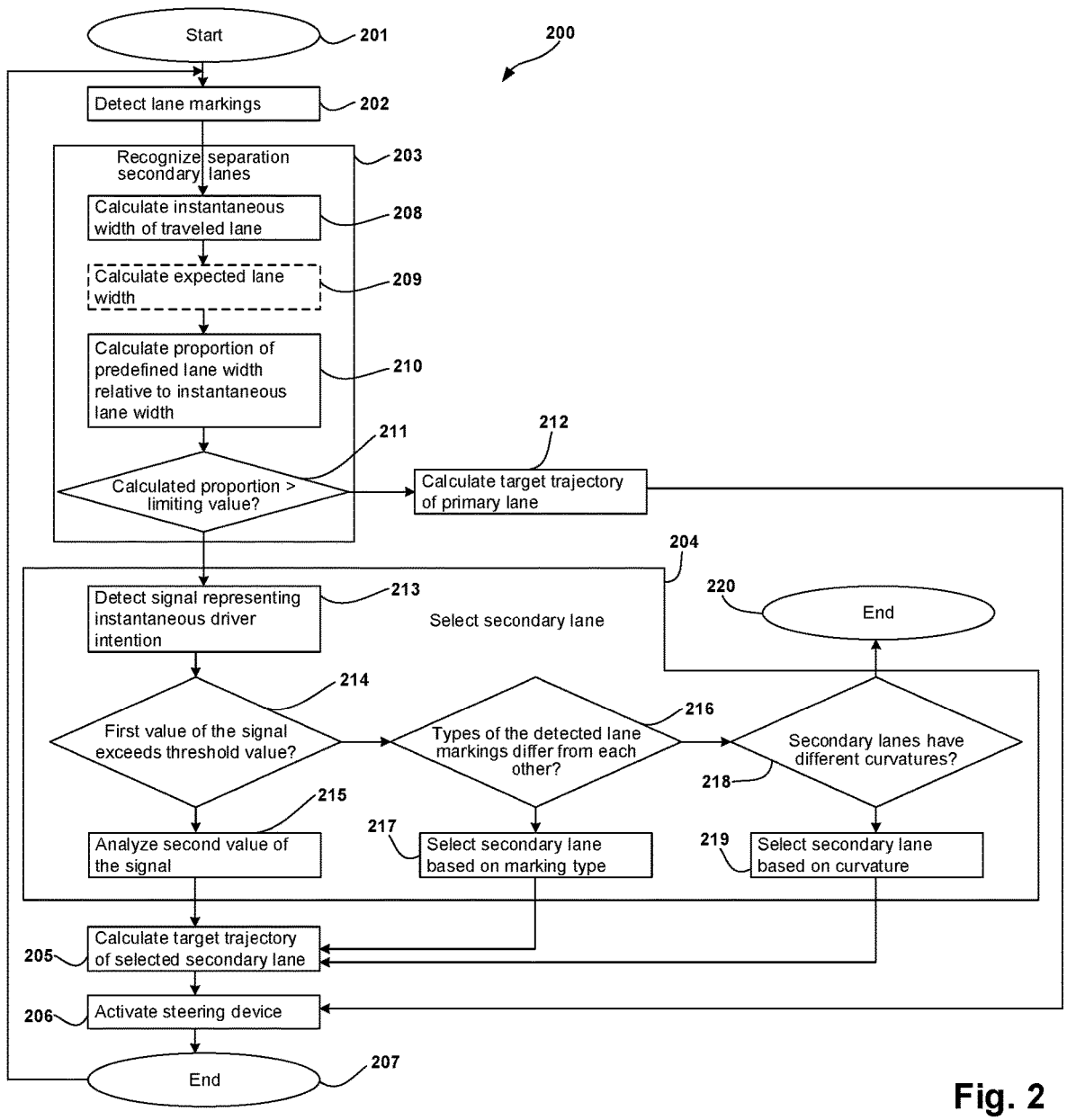
FIG. 2 shows the method for operating a lane-keeping assistance system according to an example embodiment of the present invention.

FIG. 2 shows a method 200 for operating a lane-keeping assistance system 110. Method 200 starts in step 201. In step 202, at least two lane markings are detected in a traffic space situated ahead of a vehicle with the aid of a sensor system of a lane-keeping system as has been described above.

In step 203, the separation of a primary lane into a first secondary lane and into an at least second secondary lane is recognized based on the at least two detected lane markings. For this purpose, the instantaneous lane width of the lane traveled by the vehicle is initially calculated in sub-step 208. The instantaneous lane width is calculated based on the at least two detected lane markings.

In an optional sub-step 209, an expected lane width can be calculated in advance. The expected lane width can be calculated based on lane markings detected shortly beforehand. The calculated, expected lane width has the effect of a predefined lane width for the lane-keeping assistance system. In addition or alternatively, a predefined lane width can be stored in a memory unit. A stored, predefined lane width can, for example, be a lane width typical for the region in which the vehicle is located at the moment.

In sub-step 210, the proportion of a predefined lane width relative to the instantaneous lane width is calculated. In sub-step 211, the calculated proportion is compared to a limiting value. The limiting value can, for example, also be stored in the memory unit of the lane-keeping assistance system.

If it is established in sub-step 211 that the calculated proportion is not greater than the limiting value, then it can be assumed that the primary lane does not separate. In this case, step 203 is followed by step 212. In step 212, the target trajectory of the primary lane is calculated based on the instantaneous lane width. In subsequent step 206, the steering device of the vehicle is activated in such a way that the vehicle moves along the calculated target trajectory of the primary lane.

Method 200 ends in step 207. Alternatively, method 200 can begin again.

If it is established in sub-step 211 that the calculated proportion is greater than the limiting value, then it can be assumed that the primary lane separates into at least two secondary lanes. In this case, step 203 is followed by step 204.

In step 204, one of the secondary lanes is selected. For this purpose, a signal representing the instantaneous driver intention is initially detected in sub-step 213. It can be detected, for example, whether the driver is actuating a steering wheel, a joystick and/or a keypad. It can also be detected whether a driver inputs with the aid of a gesture and/or the driver's viewing direction, in which direction the vehicle is to be guided. During the detection of the signal representing the instantaneous driver intention, the first value and the second value of the signal representing the instantaneous driver intention are also detected.

The signal representing the instantaneous driver intention is subsequently analyzed. The signal representing the instantaneous driver intention is initially analyzed with respect to a change. For this purpose, the first value of the signal representing the instantaneous driver intention can be analyzed in step 214. In this way, it can be checked whether the first value of the signal representing the instantaneous driver intention exceeds a threshold value. The threshold value can be exceeded, for example, if the driver clearly changes the position of the steering wheel of the vehicle. The threshold value can be exceeded, for example, if the driver clearly changes the position of a joystick for steering the vehicle. The threshold value can be exceeded, for example, if the driver actuates a keypad with a clearly detectable pressure for steering the vehicle. The threshold value can be exceeded, for example, if the driver clearly changes the position of the driver's hands. The threshold value can be exceeded, for example if the driver clearly changes the driver's viewing direction.

If the threshold value is exceeded, the signal representing the instantaneous driver intention can then be analyzed with respect to the direction in which the vehicle is to be guided based on the driver intention. For this purpose, the second value of the signal representing the instantaneous driver intention can be analyzed in sub-step 215. One of the at least two secondary lanes can be selected based on the second value of the signal representing the instantaneous driver intention. The selection in this case can be a function of which of the at least two sub-areas is assigned the second value.

The at least two sub-areas can represent at least two directions, for example. The second value can be assigned to a first sub-area. The first sub-area in one example can include the driver intention being that of steering the vehicle to the left along the movement direction. The second value can be assigned to a second sub-area. The second sub-area in the example just cited can include the driver intention being that of steering the vehicle to the right along the movement direction. The second value can be assigned to a third sub-area. The third sub-area in the example just cited can include the driver intention being that of maintaining the previous movement direction of the vehicle.

If the driver in this example steers the steering wheel to the left and/or directs the joystick to the left and/or actuates a key to the left, the second value of the signal representing the instantaneous driver intention can be assigned to the first sub-area. If the driver gestures to the left and/or the viewing direction of the driver shifts to the left, the second value of the signal representing the instantaneous driver intention can then be assigned to the first sub-area. If the second value of the signal representing the instantaneous driver intention in this example has been assigned to the first sub-area, the left secondary lane of the at least two secondary lanes can then be selected, for example.

If in this example the driver steers the steering wheel to the right and or directs the joystick to the right and/or actuates a key to the right, the second value of the signal representing the instantaneous driver intention can then be assigned to the second sub-area. If the driver gestures to the right and/or the viewing direction of the driver shifts to the right, the second value of the signal representing the instantaneous driver intention can then be assigned to the second sub-area. If in this example the second value of the signal representing the instantaneous driver intention has been assigned to the second sub-area, then the right secondary lane of the at least two secondary lanes can be selected, for example.

If, in this example, the driver directs the joystick forward and/or actuates a key forward, then the second value of the signal representing the instantaneous driver intention can be assigned to the third sub-area. If the driver gestures forward, then the second value of the signal representing the instantaneous driver intention can be assigned to the third sub-area. If in this example the second value of the signal representing the instantaneous driver intention has been assigned to the third sub-area, then the movement direction of the vehicle can be maintained, for example.

Sub-step 215 of step 204 is followed by step 205. In step 205, the target trajectory of the selected secondary lane is calculated.

In subsequent step 206, the steering device of the vehicle is activated in such a way that the vehicle moves along the calculated target trajectory of the selected secondary lane.

Method 200 ends in step 207. Alternatively, method 200 can begin again.

If it is ascertained in sub-step 214 that the first value of the signal representing the instantaneous driver intention does not exceed the threshold value, then sub-step 216 follows. In sub-step 216, it is checked whether the type of one of the detected lane markings differs from the type of the additional detected lane markings. If this is the case, then sub-step 217 follows. For example, it can be established that at least one of the detected lane markings represents a solid line, a broken line, a solid double line, a broken double line, or both a solid double line as well as a broken double line.

In sub-step 217, one of the secondary lanes is selected as a function of the type of detected lane markings. For example, a solid lane marking marks with greater probability the direction of an exit ramp of an expressway. It can be, for example that a planned route is predefined for the lane-keeping assistance system with the aid of a navigation device. The secondary lane, which includes the broken lane marking, would be preferred if, according to the predefined route, an exit from the expressway is not planned.

Sub-step 217 of step 204 is followed by step 205. Step 205 and the subsequent sequence of method 200 have already been described following sub-step 215.

If in sub-step 216 it is ascertained that none of the detected lane markings differs in type from the type of the additional detected lane markings, then sub-step 218 follows. In sub-step 218, it is checked whether the at least two secondary lanes have different curvatures. If this is the case, then step 219 follows.

In step 219, one of the secondary lanes is selected as a function of the curvatures of the secondary lanes. for example, in an example, the secondary lane having the smaller curvature is preferred, which means that the secondary lane that has a larger radius is preferred. For example, the exit ramp from an expressway may have a larger curvature than the expressway itself. In an example, a predefined route is planned for the lane-keeping assistance system with the aid of a navigation device, and, if, according to the predefined route, an exit from the expressway is not planned, the secondary lane having the smaller curvature would be preferred. Alternatively, the secondary lane having the larger curvature may be preferred.

Sub-step 219 of step 204 is followed by step 205. Step 205 and the subsequent sequence of method 200 have already been described following sub-step 215. The above-described applies similarly here.

Alternatively, it can be ascertained in sub-step 218 that the at least two secondary lanes have almost identical curvatures, which can mean that a selection of one of the secondary lanes is not possible, so that, in this case, method 200 is terminated in step 220.

What is claimed is:

1. A method for operating a lane-keeping assistance system of a vehicle, the method comprising:
    detecting, using a sensor system, at least two lane markings in a traffic space situated ahead of the vehicle;
    recognizing, using a processor, a separation of a primary lane into a first secondary lane and a second secondary lane based on the at least two detected lane markings;
    selecting, using the processor, one of the first and second secondary lanes, wherein the selecting includes detecting and analyzing a signal representing an instantaneous driver intention;
    calculating, using the processor, a target trajectory of the selected secondary lane; and
    activating, using the processor, a steering device of the vehicle for guiding the vehicle along the calculated target trajectory of the selected secondary lane.

2. The method of claim 1, wherein the detection of the signal representing the instantaneous driver intention takes place based on an input of a driver.

3. The method of claim 1, wherein the signal representing the instantaneous driver intention includes a first value and a second value assignable to at least two sub-areas.

4. The method of claim 3, wherein the analysis includes comparing the first value to a threshold value.

5. The method of claim 4, wherein the selection is performed based on the second value of the signal in response to a result of the comparison being that the first value exceeds the threshold value.

6. The method of claim 4, wherein the selection is performed based on a predefined criterion in response to a result of the comparison being that the first value does not exceed the threshold value.

7. The method of claim 6, wherein the predefined criterion is at least one of a category and a curvature of the at least two detected lane markings.

8. The method of claim 1, wherein the recognizing includes:
    calculating an instantaneous lane width based on the at least two detected lane markings; and
    comparing the calculated instantaneous lane width with a predefined lane width.

9. The method of claim 8, wherein the predefined lane width is at least one of stored in a memory unit of the lane-keeping assistance system and calculated based on the at least two detected lane markings.

10. A lane-keeping assistance system of a vehicle, the system comprising:
- a sensor system configured for detecting at least two lane marking in a traffic space situated ahead of the vehicle; and
- a processor, wherein the processor is configured to:
  - recognize a separation of a primary lane into a first secondary lane and a second secondary lane based on the at least two lane markings detected by the sensor system;
  - select one of the first and second secondary lanes, wherein the selecting includes detecting and analyzing a signal representing an instantaneous driver intention;
  - calculate a target trajectory of the selected secondary lane; and
  - activate a steering device of the vehicle for guiding the vehicle along the calculated target trajectory of the selected secondary lane.

11. A non-transitory computer-readable medium on which are stored instructions that are executable by a processor and that, when executed by the processor, cause the processor to perform a method for operating a lane-keeping assistance system of a vehicle, the method comprising:
- detecting, using a sensor system, at least two lane markings in a traffic space situated ahead of the vehicle;
- recognizing a separation of a primary lane into a first secondary lane and a second secondary lane based on the at least two detected lane markings;
- selecting one of the first and second secondary lanes, wherein the selecting includes detecting and analyzing a signal representing an instantaneous driver intention;
- calculating a target trajectory of the selected secondary lane; and
- activating a steering device of the vehicle for guiding the vehicle along the calculated target trajectory of the selected secondary lane.

* * * * *